Jan. 16, 1962 K. J. BRAUN 3,017,076

RECORD PERFORATING MACHINES

Filed Dec. 31, 1957 4 Sheets-Sheet 1

Inventor
Karl J. Braun
By his Attorney

Jan. 16, 1962 K. J. BRAUN 3,017,076

RECORD PERFORATING MACHINES

Filed Dec. 31, 1957 4 Sheets-Sheet 2

Jan. 16, 1962

K. J. BRAUN 3,017,076

RECORD PERFORATING MACHINES

Filed Dec. 31, 1957

4 Sheets-Sheet 3

3,017,076
RECORD PERFORATING MACHINES

Karl J. Braun, Springdale, Conn., assignor to A. Kimball Company, New York, N.Y., a corporation of New York Filed Dec. 31, 1957, Ser. No. 706,453
7 Claims. (Cl. 234—78)

This invention relates generally to machines for perforating statistical records. More particularly the invention relates to a machine adapted to perforate variable data in a record in the form of coded holes.

According to the preferred embodiment of the invention a hand operated machine is provided for perforating small records, such as record tags, utilized in the apparel industry for keeping inventory records, billing recording, merchandise control, accounting and similar procedures. The scope of the invention, however, includes the perforation of a variety of record cards also commonly used in accounting procedures.

The machine illustrated and described herein may be utilized as the sole means for recording encoded data on records or may be utilized for the addition of variable data to a record previously perforated with data indications. As illustrated the machine is provided with a number of columns of punches. The punches of each column are adapted to be selectively rendered effective in various combinations to perforate a tag in accordance with a predetermined code. To this end each column of punches has associated therewith an individual gag bar which is settable to one or more of a plurality of positions for selecting combinations of punches to perforate the tag or to a neutral position wherein none of the punches are selected. Each of the bars is provided with an actuating handle which extends through a casing on the machine, thus forming a keyboard having a plurality of sliding keys. Each key is provided with indicia to indicate to an operator the data indication that will be punched in a particular column of the tag for a particular setting of each key.

In normal usage of the above type of tag, it is highly desirable to add to the tag variable information such as pertinent to point of use or sale information. Such information may include date, clerk's number, customer's account number, repricing, etc. Since an individual clerk's number is rarely changed, it is highly desirable to provide each clerk with an individualized master key which is coded with his number. Thus if the first three columns to be perforated in the tag are allotted to clerk number, then the clerk's number may be introduced with greater convenience and accuracy by means of his individual master key rather than by setting the keyboard. The same could be said of the customer's account number and a group of columns reserved for this purpose at the opposite side of the tag to be controlled by a customer's master key.

Accordingly, it is an object of the invention to provide a record perforating machine which is alternatively settable either from a keyboard or from an individualized master key. To this end individualized master keys are provided with perforations arranged to be alined with the columns of punches which are to be set by the master key. The gag bars are so arranged that a master key is insertable to select predetermined punches only when the gag bars normally utilized to control the same punches are moved to their neutral positions.

So that a tag to be perforated may be easily yet accurately positioned relative to the punches, the machine is provided with positioning means adapted to be moved from an exposed position suitable for manual placement of a tag thereon to a position accurately registered with the punches. Therefore, it is an object of the invention to provide a tag positioning means which is normally biased in an exposed loading position but which is movable to a punching position where it is latched only when accurately registered with the punches. In this manner the tag is returned to loading position if it is not accurately registered with the punches, but is locked in place when accurately registered.

It is a further object of the invention to provide a record perforating machine whose punching members are alternatively controlled either by a manually settable selection means or by a second selection means comprising a control member insertable into the machine; and in which either of the selection means, when effective, will prevent the other selection means from being effective.

The above and other features of the invention together with novel details of construction and combinations of parts will now be described with reference to the drawings and thereafter pointed out in the claims.

Figure 1:
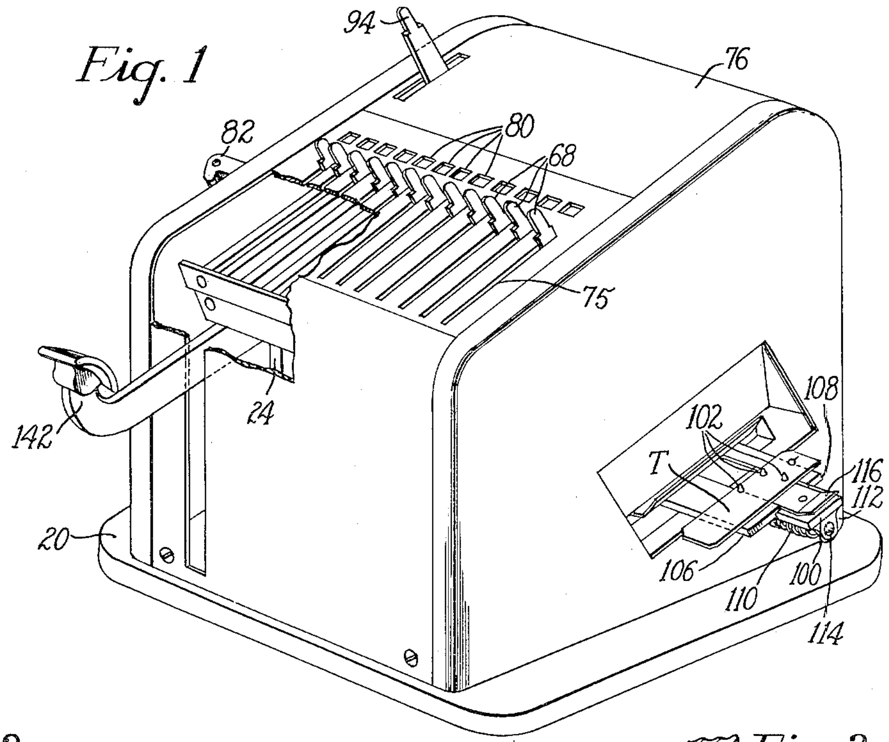
FIG. 1 is a perspective view of one form of a record punching machine in which the invention may be embodied.

The frame of the machine includes a base plate 20 having two upright end frames 22 and 24 (FIGS. 4 and 5) secured thereto. The end frames are also secured together by a cross bar 28 and a block 26. The punching instrumentalities are carried by a punch block 30 which is mounted for heightwise movements on two guide rods 32 fixed to and depending from the underside of the block 26. The punch block 30 is urged downwardly along the rods 32 by two springs 34 arranged between the blocks. Downward movement of the punch block is limited by a pair of stop members 36 which are secured to the front and rear sides of the block 26.

The illustrated machine is provided with sixty punches 38 which are arranged in twelve columns of five punches each, each punch being mounted for heightwise axial movement in the punch block 30. The punches extend upwardly through a stripper plate 42 secured to the underside of the block 26, the plate being arranged to cooperate with the underside of headed ends 44 of the punches for withdrawing the punches from a tag after the punching operation in a manner well known to those skilled in the art.

Figure 4:
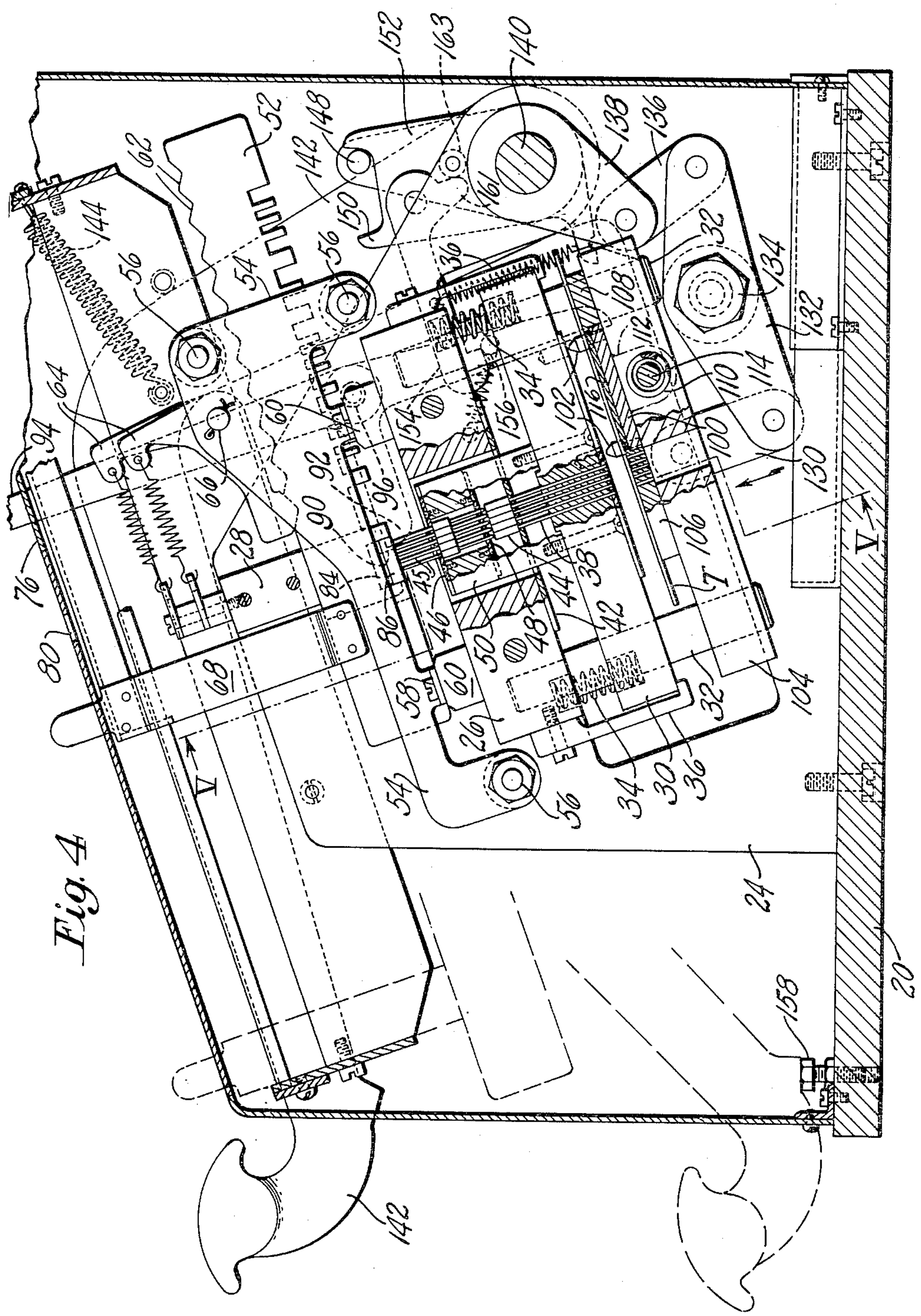
FIG. 4 is a side elevation of the machine with the casing and parts of the frame broken away.
Figure 5:
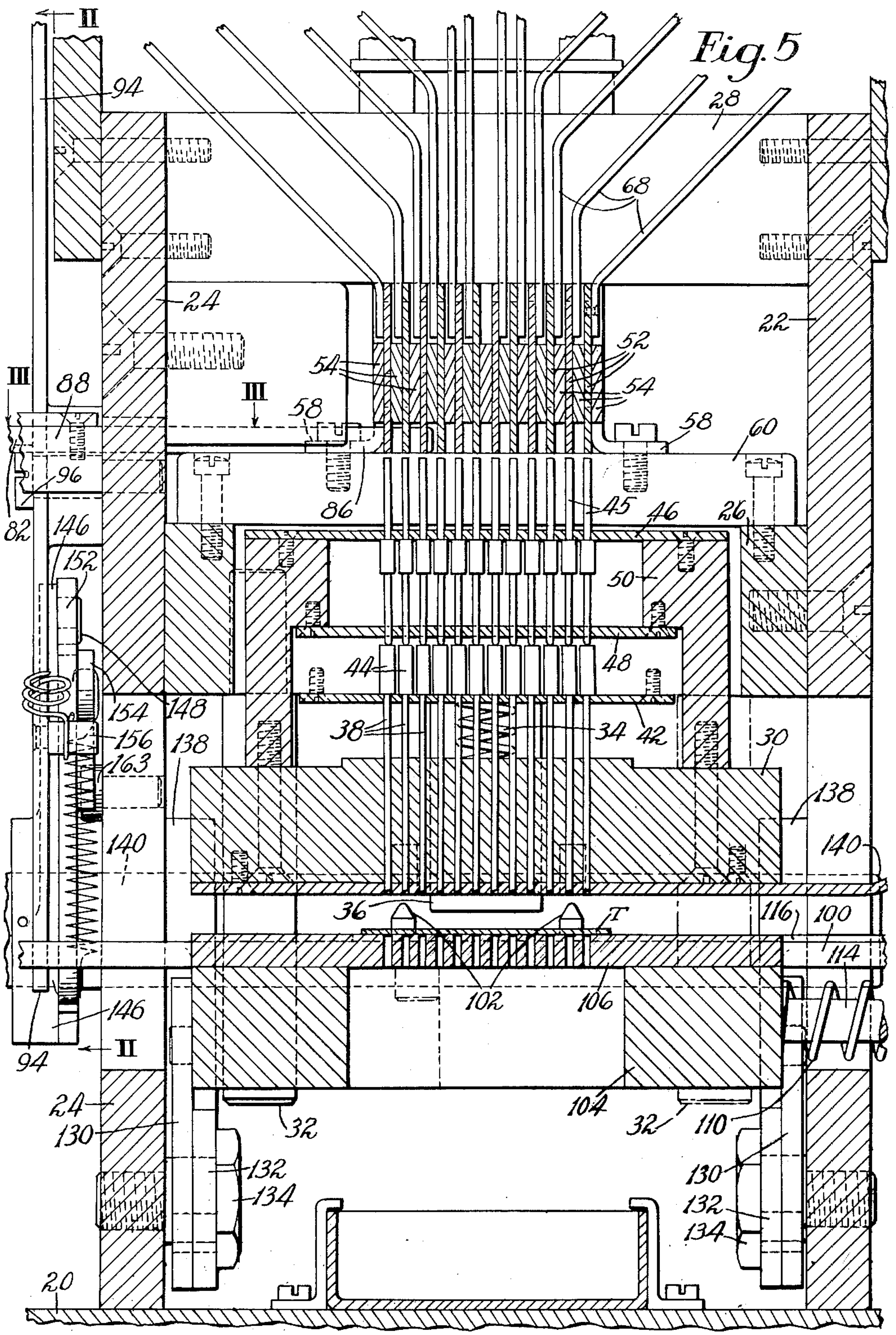
FIG. 5 is a section in front elevation on the line V—V of FIG. 4.
Figure 6:
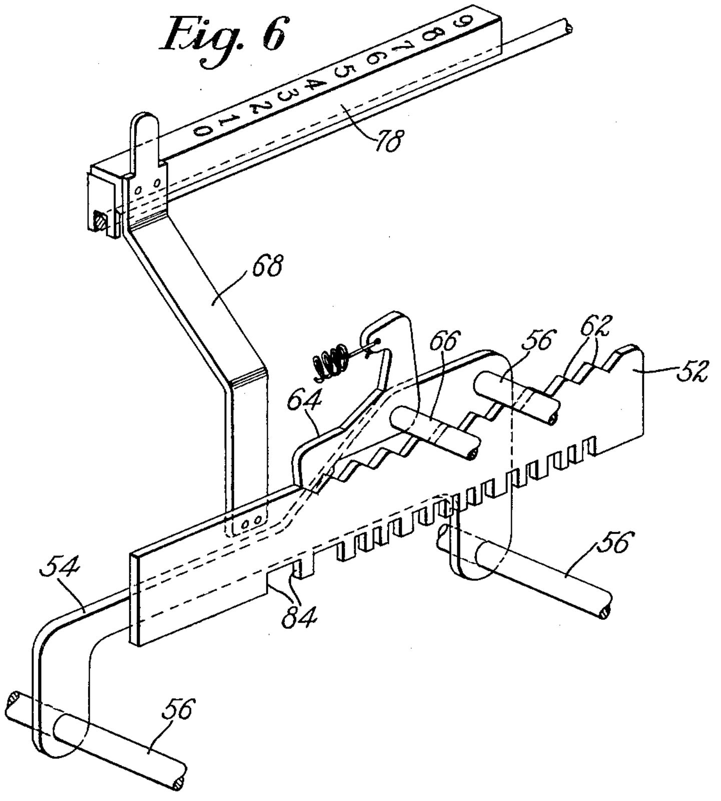
FIG. 6 is a perspective view illustrating the arrangement of a single gag bar.

The machine is also provided with sixty extension pins 45 which are co-axial with the punches as seen in FIGS. 4 and 5. The pins at their lower ends engage the upper ends of the punches and are mounted for axial movement between a pair of transverse plates 46 and 48 which are secured to the top and bottom, respectively, of a transverse portion of a U-shaped block 50. The two vertical legs of the block 50 straddle the stripper plate 42, as seen in FIG. 5, and are fixed to the upper side of the punch block 30. In this manner the punch section of the machine including the punches 38 and pins 45 is arranged to be moved heightwise along the rods 32 against the action of the springs 34. The upper ends of the pins 45 in each individual column are arranged to be engaged selectively by an individual gag bar 52, there being twelve gag bars associated with the twelve columns of pins and punches. On their lower edges the gag bars are provided with a plurality of lugs which are adapted to cooperate with the pins 45 to gag the punches for perforating the tag.

The gag bars are arranged to slide between a number of plates 54 which are spaced apart by suitable spacer washers and are secured together by bolts 56 to form a comb-like unit. The two outside plates 54, as seen in FIG. 5, have outturned flanges 58 which are secured to two cross bars 60 fixed to the upper side of the block 26. The two bars 60 and the bar 28 guide the gag bars against heightwise movement while the plates 54 guide the gag bars against transverse movement.

The gag bars are provided on their upper edges with eleven V-shaped detent notches 62 which cooperate with spring urged detent levers 64 mounted on a pin 66 which extends through the plates 54. Thus each gag bar is maintained by an associated detent lever in any one of eleven predetermined positions to which it may be set. The gag bar 52, shown in FIG. 4, is in its neutral position for gagging none of its associated punches but when moved to any one of the positions determined by the notches 62 and its detent lever 64 the lugs on the lower edge of the gag bar cooperate with the pins 45 to gag the punches to perforate a tag in accordance with a predetermined code. Each gag bar is provided with a handle 68 which extends upwardly through a slot 75 in a casing 76. As seen in FIG. 1, the handles 68 extending through the casing form a keyboard for manual setting of the gag bars. Each handle has a rearwardly extending indicator plate 78 having spaced numerals which are visible through openings 80 in the casing. By setting each handle 68 individually an operator determines what digit will be punched in each column of the tag, the digits being indicated to the operator by which numerals on the plates 78 are visible through the openings 80.

Figures 2, 3:
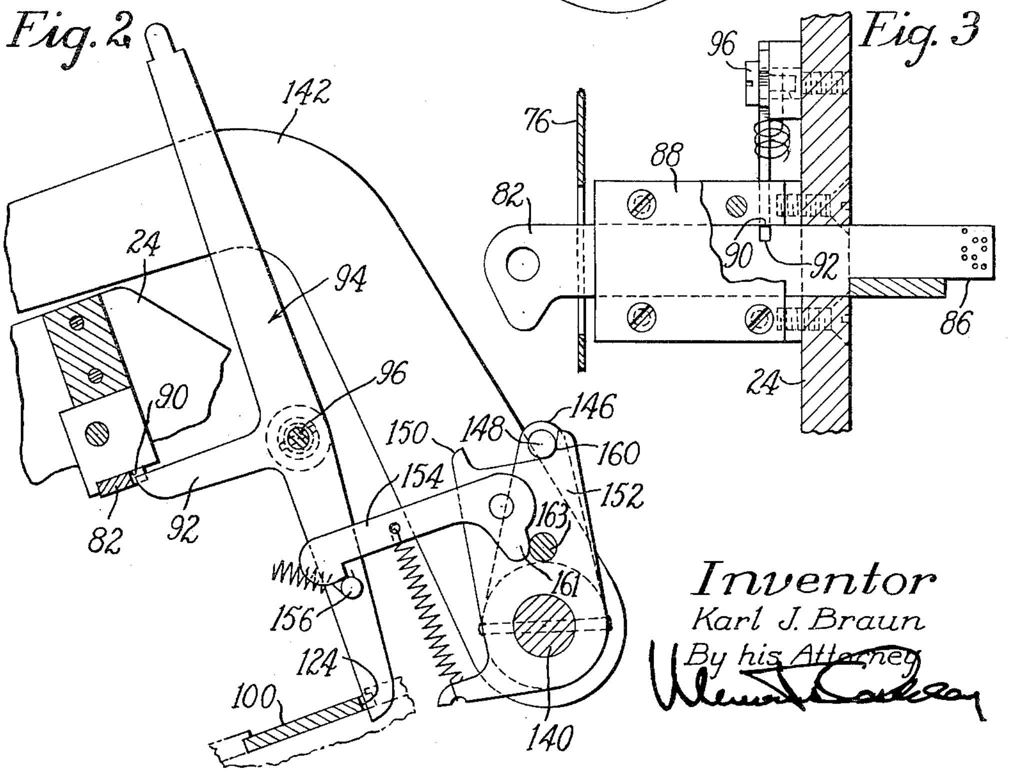
FIG. 2 is a section on the line II—II of FIG. 5.
FIG. 3 is a section on the line III—III of FIG. 5.

As previously stated, it is highly desirable at times to enable an operator to set certain columns of the key board according to a fixed code number individual to the operator. To this end each operator is provided with an individualized master key 82 which is coded with his individual number. The master key 82 shown in FIG. 3, is adapted to gag the first three columns of punches at the left of the machine as seen in FIG. 5. Before the master key may be inserted by an operator the gag bars for the first three columns must be set in their neutral positions in which a blank space on the indicators 78 show through the openings 80. In this position a slot 84 in each gag bar 52 is alined with the punches forming an opening for receiving the end 86 of the master key over the pins 45. For guiding the master key into this position a guide block 88 with a suitable guideway is secured to the frame member 24. The end 86 of the master key has three columns of perforations which are alined with the first three columns of the pins 45 when the key is in the position illustrated in FIG. 3. When the punching mechanism is operated three of the pins 45 of each column are free to pass through the perforations in the key while two of the pins in each column are held down to force the two punches associated therewith through the tag. For insuring that the key is properly positioned the key is provided with a square notch 90 adapted to receive the end of a latch 92 as seen in FIG. 2. The latch is formed on a lever 94 which extends upwardly through the casing 76 and is pivoted on a stud 96 projecting from the end frame 24.

When the master key 82 is in effective position, it will prevent the gag bars 52 and therefore also handles 68 from being moved out of their neutral position. As shown in FIG. 4, the end portion 86 of master key 82 is substantially the same width as the slots 84 in gag bars 52. Therefore, after the key has been inserted to effective position as described in the preceding paragraph, the three leftmost gag bars 52 are locked against any attempt by the operator to move them to any other position since the end 86 of the key and the slots 84 are of the same width.

Figures 7, 8:
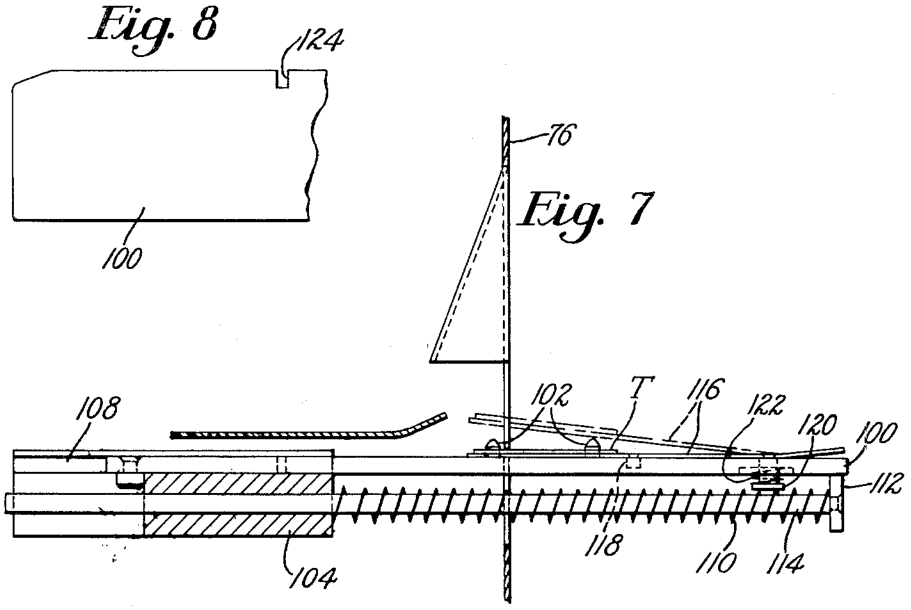
FIG. 7 is a partial section in front elevation illustrating the mounting of the tag slide.
FIG. 8 is a fragmentary plan view of one end of the tag slide.

For accurately locating a tag under the punches 38 the machine is provided with a tag slide 100 which is provided with three locating pins 102 adapted to be received in three corresponding locating holes in the tag to be perforated. The tag slide is movable transversely of the machine on a block 104 which is mounted for heightwise movement on the guide rods 32. For guiding the slide the block 104 has fixed thereto two guide members 106 and 108. The member 106 is also perforated to serve as a die block when the tag is punched. As seen in FIG. 1, the tag slide 100 is in its loading position where a tag T may be manually placed on the locating pins 102. The tag slide is yieldingly biased into the loading position by a spring 110 compressed between the right side of the block 104 as seen in FIG. 7 and a lug 112 depending from the end of the tag slide. The spring 110 slides on a rod 114 secured to the lug 112 and extending into a bore in the block 104.

So that the tag T may be easily removed from the pins 102 without damage to the locating holes in the tag, a stripper 116 (FIG. 7) is mounted on the tag slide 100 so as to underlie and support the tag on the slide. The stripper is provided with two pins 118 and 120 which are slidably receiving in corresponding holes in the tag slide. The pin 120 is headed to restrain a spring 122 which underlies the tag slide and yieldingly holds the stripper flat on the slide. As seen in FIG. 7, one end of the stripper is upturned so that when an operator depresses the upturned end the stripper rocks to lift the tag off the locating pins 102.

After placement of a tag on the locating pins the operator pushes the tag slide into the machine against the action of the spring 110 until a square notch 124 (FIGS. 2 and 8) in the tag slide is alined with the lower end of the lever 94 allowing the lever to move into the notch latching the tag slide in its punching position as seen in FIG. 5.

So that the tag T may be moved up against the lower ends of the punches to force those punches that are gagged by the gag bars 52 or by the master key 82 through the tag, the block 104 is connected at opposite sides as seen in FIGS. 4 and 5 by links 130 to the forward ends of two levers 132. The levers 132 are mounted for rocking movements on headed studs 134 in the end frames 22 and 24. The rear ends of the levers 132 are connected by links 136 to arms 138 pinned to a shaft 140 journaled in the end frames 22 and 24. Outside the frame 24 the shaft has fixed thereto an operating handle 142 which extends forwardly through the front of the casing 76 as seen in FIGS. 1 and 4. The handle is normally held in the position illustrated by a spring 144 as seen in FIG. 4. Thus to punch the tag T, the operator moves the front end of the handle 142 down to the dash line position indicated on FIG. 4, causing the arms 138 and links 136 to straighten in a toggle action, rocking the levers 132 to raise the block 104 on the guide rods 32 and moving the tag against the lower end of the punches. During the initial upward movement of the block 104, the locating pins 102 move into matching holes in the underside of the punch block 30 accurately alining the tag and tag slide with the punches. Continued upward movement of the tag raises the punch block 30 against the action of the springs 34 together with those punches that are not gagged. During his movement the punches that are gagged by the gag bars 52 or the master key 82 are forced through the tag and into the perforations in the guide member 106 acting as a die block.

Downward movement of the handle 142 also causes counter-clockwise movement of an arm 146 (FIG. 2) fixed to the shaft 140. At this time a pin 148 in the upper end of the arm 146 moves forwardly until it engages a projection 150 on a member 152 journaled on the shaft 140. Continued movement of the pin 148 rocks the member 152 forwardly until a latch 154 pivoted on the member 152 drops over the front of a pin 156 in the lever 94. When the handle is moved to its lowermost position and against a stop 158, the tag is completely punched and the latch 154 has dropped over the pin 156. The operator then returns the handle to its initial position thus dropping the block 104 and hence also the tag to their lower positions. The punch block also drops to the position determined by the stops 36 and the stripper plate 42 withdraws the punches from the tag.

During the return movement of the handle the arm 146 swings rearwardly until the pin 148 strikes a projection 160 on the member 152 moving the member and the latch 154 rearwardly. The lever 94 is thus swung counter-clockwise, as seen in FIG. 2, releasing both the key 82 and the tag slide 100. Continued movement of the member 152 causes a lug 161 on the latch 154 to strike a pin 163 in the frame 24 causing the latch to release the pin 156. As soon as the lower end of the lever 94 is moved out of the slot 124 the tag slide is moved by the spring 110 to its initial loading position as seen in FIG. 1. The operator then depresses the bent end of the tag stripper 116 to remove the tag from the locating pins 102.

From the foregoing description of the machine it should be apparent that a record tag may be perforated to record variable data according to a predetermined code. Any encoded digits may be recorded on the tag as determined either selectively by operator setting of a keyboard or by individualized master keys inserted in place of a keyboard setting. With slight modification the machine could be adapted to receive two master keys inserted from both sides of the machine. By varying the lengths of the master keys any number of punch columns could be controlled in this manner.

Having thus described my invention, what I claim as new and desire to secure by Letters Patent of the United States is:

1. In a record perforating machine: punching means for recording information on a record member in the form of punched perforations, said punching means comprising side-by-side columns of selectively operable punching members; manually settable first selection means for controlling said columns of punching members; second selection means for alternately controlling one or more of said columns of punching members which are adapted to be controlled by said first selection means, said second selection means comprising a selection member insertable into said machine to an operable position and removable from said machine; said machine including means for receiving said selection member and guiding it to said operable position; and means for preventing either of said selection means from controlling said one or more columns of punching members if the other selection means is effective to control said one or more columns.

2. The combination according to claim 1; wherein said selection member carries selection control indicia.

3. The combination according to claim 2; wherein said selection control indicia comprise perforations.

4. The combination according to claim 2; wherein said first selection means is settable to a neutral, ineffective condition with respect to at least said one or more alternately controlled columns of punching members, and wherein said preventing means includes means effective to disable movement of the selection member to operable position unless said first selection means is set to neutral condition with respect to said one or more alternately controlled columns of punching members.

5. The combination according to claim 2; wherein said first selection means is settable to a neutral, ineffective condition with respect to at least said one or more alternately controlled columns of punching members, and wherein said preventing means includes means effective to: (*a*) disable movement of the selection member to operable position unless said first selection means is set to neutral condition with respect to said one or more alternately controlled columns of punching members; and (*b*) disable setting of said first selection means from said neutral condition with respect to said one or more alternately controlled columns of punching members if said selection member is in operable position.

6. A record perforating device comprising a plurality of punches arranged to punch data indicative perforations in individual records, a plurality of settable means each being movable to any one of a plurality of positions for selecting associated punches in accordance with data to be recorded and also being movable to a neutral position where none of the associated punches are selected, a key for selecting a pattern of punches normally selectable by said settable means, record supporting means normally biased to an exposed position suitable for placement of a record thereon and movable to a punching position where said record is accurately registered with said punches, and latching means for locking said supporting means and said key when both are accurately registered with said punches.

7. A record perforating device comprising a plurality of punches arranged to punch data indicative perforations in individual records, a plurality of settable means each being movable to any one of a plurality of positions for selecting associated punches in accordance with data to be recorded and also being movable to a neutral position where none of the associated punches are selected, a key for selecting a pattern of punches normally selectable by said settable means, record supporting means normally biased to an exposed position suitable for placement of a record thereon and movable to a punching position where said record is accurately registered with said punches, latching means for locking said supporting means and said key when both are accurately registered with said punches, and means effective only after said record is punched for releasing said latching means thereby causing said supporting means to return to said exposed position and causing said key to be released for removal.

References Cited in the file of this patent

UNITED STATES PATENTS

| | | |
|---|---|---|
| 957,221 | Lankin | May 10, 1910 |
| 1,812,620 | Braitmayer | June 30, 1931 |
| 2,008,396 | Lasker | July 16, 1935 |
| 2,768,691 | Cooper et al. | Oct. 30, 1956 |
| 2,808,107 | Berghell | Oct. 1, 1957 |